US012211293B2

United States Patent
Weston et al.

(10) Patent No.: US 12,211,293 B2
(45) Date of Patent: Jan. 28, 2025

(54) VEHICLE LOADING AND PASSAGE CONFIGURATOR

(71) Applicant: FORD GLOBAL TECHNOLOGIES, LLC, Dearborn, MI (US)

(72) Inventors: Keith Weston, Canton, MI (US); Brendan F. Diamond, Grosse Pointe, MI (US); Michael Alan McNees, Flat Rock, MI (US); Jordan Barrett, Milford, MI (US); Andrew Denis Lewandowski, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 17/671,637

(22) Filed: Feb. 15, 2022

(65) Prior Publication Data

US 2023/0260295 A1    Aug. 17, 2023

(51) Int. Cl.
*G06V 20/59* (2022.01)
*B60W 40/13* (2012.01)
*G06T 15/00* (2011.01)
*G06T 15/08* (2011.01)

(52) U.S. Cl.
CPC ............. *G06V 20/59* (2022.01); *B60W 40/13* (2013.01); *G06T 15/005* (2013.01); *G06T 15/08* (2013.01)

(58) Field of Classification Search
None
See application file for complete search history.

(56) References Cited

U.S. PATENT DOCUMENTS

| 7,137,556 B1 | 11/2006 | Booner et al. |
| 7,353,192 B1 * | 4/2008 | Ellis ............... G06Q 30/02 715/765 |
| 9,358,975 B1 * | 6/2016 | Watts ............... G05D 1/0223 |

(Continued)

FOREIGN PATENT DOCUMENTS

DE    102019126370 A1    4/2020

OTHER PUBLICATIONS

Zhu W, Qin H, Lim A, Wang L. A two-stage tabu search algorithm with enhanced packing heuristics for the 3L-CVRP and M3L-CVRP. Computers & Operations Research. Sep. 1, 2012;39(9):2178-95. (Year: 2012).*

(Continued)

*Primary Examiner* — Michelle M Entezari Hausmann
(74) *Attorney, Agent, or Firm* — Joseph Zane; Brooks Kushman P.C.

(57) ABSTRACT

A system receives identification of an item to be loaded into a vehicle and determines dimensions of the item. The system adds the item to a total load for an identified vehicle and, based on known dimensions of available space in the identified vehicle, determines one or more candidate placement options for each of one or more items comprising the total load, within available space within the vehicle, wherein candidate placement options for each item are determined so as not to overlap with placement options for another of the one or more items within a given configuration representing placement options for all of the one or more items comprising the total load. Additionally, the system presents a visual rendering of at least one given configuration that successfully allows the total load to fit within the available space.

18 Claims, 3 Drawing Sheets

(56) References Cited

U.S. PATENT DOCUMENTS

| | | | | |
|---|---|---|---|---|
| 10,528,212 | B2* | 1/2020 | Gross | G06T 7/60 |
| 10,769,587 | B2* | 9/2020 | Durkee | B65G 1/1378 |
| 10,810,540 | B1* | 10/2020 | Gopal | G01G 19/42 |
| 11,580,484 | B2* | 2/2023 | Patnaik | B60W 60/00256 |
| 2007/0265754 | A1 | 11/2007 | Curtis et al. | |
| 2008/0046302 | A1* | 2/2008 | Cartwright | G06Q 10/04 |
| | | | | 705/7.22 |
| 2017/0161673 | A1* | 6/2017 | High | G06Q 10/083 |
| 2021/0150234 | A1* | 5/2021 | Jablonski | G06Q 50/40 |
| 2022/0414594 | A1* | 12/2022 | Wintz | G06Q 10/00 |
| 2023/0214951 | A1* | 7/2023 | Grob | G06Q 10/043 |
| | | | | 705/7.39 |

OTHER PUBLICATIONS

Mazur, Philipp Gabriel, et al. "Designing a Physical Packing Sequence Algorithm with Static Stability for Pallet Loading Problems in Air Cargo." Computational Logistics: 12th International Conference, ICCL 2021, Enschede, The Netherlands, Sep. 27-29, 2021 (Year: 2021).*

Bortfeldt, Andreas, and Gerhard Wäscher. "Constraints in container loading-A state-of-the-art review." European Journal of Operational Research 229.1 (2013): 1-20. (Year: 2013).*

* cited by examiner

VEHICLE LOADING AND PASSAGE CONFIGURATOR

TECHNICAL FIELD

The illustrative embodiments, and the like, generally relate to methods and apparatuses for loading and passage configurators, including vehicle loading and passage configurators.

BACKGROUND

Large capacity and capability vehicles are very popular purchases, both to accommodate large quantities of people and large quantities of objects or large objects. For example, a sport utility vehicle (SUV), truck, or mini-van may be purchased with the goal of transporting a family of five along with luggage, sporting equipment, etc. In other instances, people may purchase such vehicles to transport equipment or large items, such as furniture. Even when multi-item or large item transport is not a primary goal, people appreciate having the capacity to transport such items on an as-needed basis.

While a professional who purchases such a vehicle may know exactly what it needs to regularly transport, and may carefully determine a vehicle capacity with regards to intended transportation, many times both professionals and others will transport irregular objects or large loads on a spot basis. Having potentially never even considered such a load on purchase, it is unlikely that the owner selected the vehicle with the precise specifications for such a load. More likely, the owner bought a large vehicle assuming it could handle most large loads, but never gave specific thought to passageways (entries into the vehicle) as well as actual clearances and open spaces. This can lead to some difficulty loading large objects or large multi-object loads, and sometimes may leave an owner confounded as to how to stow a load or how to properly maneuver an object through a seemingly large-enough passageway.

Even if passageway dimensions are known, it can be a sometimes difficult task to determine entry-angles and placements of immovable or semi-immovable objects (seats, seat backs, consoles, etc.) and this can lead to difficulty in loading a vehicle. In other instances, individual objects may fit easily through the passageways, but an optimal or useful configuration of object arrangement can be difficult to determine without loading, unloading and reloading repeatedly until everything is successfully loaded into a vehicle. This can lead to a loss of time, frustration, and ultimately negative feelings towards a vehicle, if the owner feels the load should fit easily and yet it takes multiple attempts to place all the objects within the vehicle. A lack of appreciation of space sizing within the vehicle can even lead to a futile attempt to load a vehicle, even if there are multiple achievable load configurations, because the owner simply cannot appreciate how to locate the load within the vehicle to achieve a successful loading.

SUMMARY

In a first illustrative embodiment, a system includes one or more processors configured to receive identification of an item to be loaded into a vehicle. The one or more processors are further configured to determine dimensions of the item and add the item to a total load for an identified vehicle. The one or more processors are also configured to, based on known dimensions of available space in the identified vehicle, determine one or more candidate placement options for each of one or more items comprising the total load, within available space within the vehicle, wherein candidate placement options for each item are determined so as not to overlap with placement options for another of the one or more items within a given configuration representing placement options for all of the one or more items comprising the total load. Additionally, the one or more processors are configured to present a visual rendering of at least one given configuration that successfully allows the total load to fit within the available space.

In a second illustrative embodiment, a method includes receiving identification of an item to be loaded into a vehicle and determining dimensions of the item. The method also includes adding the item to a total load for an identified vehicle and, based on known dimensions of available space in the identified vehicle, determining one or more candidate placement options for each of one or more items comprising the total load, within available space within the vehicle, wherein candidate placement options for each item are determined so as not to overlap with placement options for another of the one or more items within a given configuration representing placement options for all of the one or more items comprising the total load. Also, the method includes presenting a visual rendering of at least one given configuration that successfully allows the total load to fit within the available space.

In a third illustrative embodiment, a non-transitory computer-readable storage medium stores instructions that, when executed, cause at least one executing processor to perform a method that includes receiving identification of an item to be loaded into a vehicle and determining dimensions of the item. The method also includes adding the item to a total load for an identified vehicle and, based on known dimensions of available space in the identified vehicle, determining one or more candidate placement options for each of one or more items comprising the total load, within available space within the vehicle, wherein candidate placement options for each item are determined so as not to overlap with placement options for another of the one or more items within a given configuration representing placement options for all of the one or more items comprising the total load. Also, the method includes presenting a visual rendering of at least one given configuration that successfully allows the total load to fit within the available space.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments, and the like, present examples of automatic load tracking and configurators. These features can be used, for example, while shopping for multiple objects, where dimensioning processes receive object dimensions and keep active track of remaining available three dimensional space. Similarly, when purchasing a large object, load analysis can determine if a passageway into the vehicle is sufficient, if clearances and spacing can be achieved to fit the object, and, in some cases, whether the object can pass through ingresses and chokepoints within a home, if the configuration of such aspects of the home is also known.

Because the illustrative examples can conceptualize actual possible vehicle space and millions of possible seat and other movable-object reconfiguration, as well as accommodate intended passenger seating, the sometimes-impossible task of planning and loading a vehicle load can be made significantly easier, as well as avoiding damage to the vehicle by attempting to force an object through an insufficient passageway. Further, the owner can avoid overshopping, in certain instances, avoiding a situation wherein a large number of objects, that simply cannot all fit within a vehicle, are purchased, transported to the vehicle, and then some number of those objects need to be returned. Vehicle passageway sizes, spacing sizes, seat configurations and clearances are all generally known and fixed (in maximums and minimums) relative to a given vehicle, but appreciating this complex three-dimensional environment with movable parts can be a very difficult task.

If the configurator can access specification on an object (e.g., through use of information available from an object manufacturer), the configurator may also be able to appreciate limitations such as orientation and possible load configurations that could lead to item problems, and can account for this as well when planning a load. This can include, but is not limited to, orientation of objects (e.g., this side up), contemplating known fragility of objects, and preventing overloading on top of an object that is not designed to support significant weight, which is a consideration that may apply to both purchased objects and objects included with the vehicle itself (e.g., avoiding resting too much weight on an arm support or console). Even if certain of these limitations are apparent from packaging, it is infrequent that an armrest or console has an openly displayed load-limit, as these objects are generally designed to hold things such as arms, and not necessarily the weight of a 700-pound load of wood or a boxed, cast-iron stove.

Further, because the configurator can contemplate a myriad of orientations and organizational strategies, it can attempt to position objects such that loads on the weaker elements of a vehicle are reduced almost entirely or avoided altogether. This is in contrast to the common approach of simply loading things and "seeing how it goes," whereby a user may not initially overload a support, but may eventually overload the support with layers or not appreciate the ever-increasing load or pressure being placed on a support by the individual placement of objects. The configurator can also calculate spaces in trailers, truck beds, etc., which are encompassed by the notion of available space.

Figure 1:
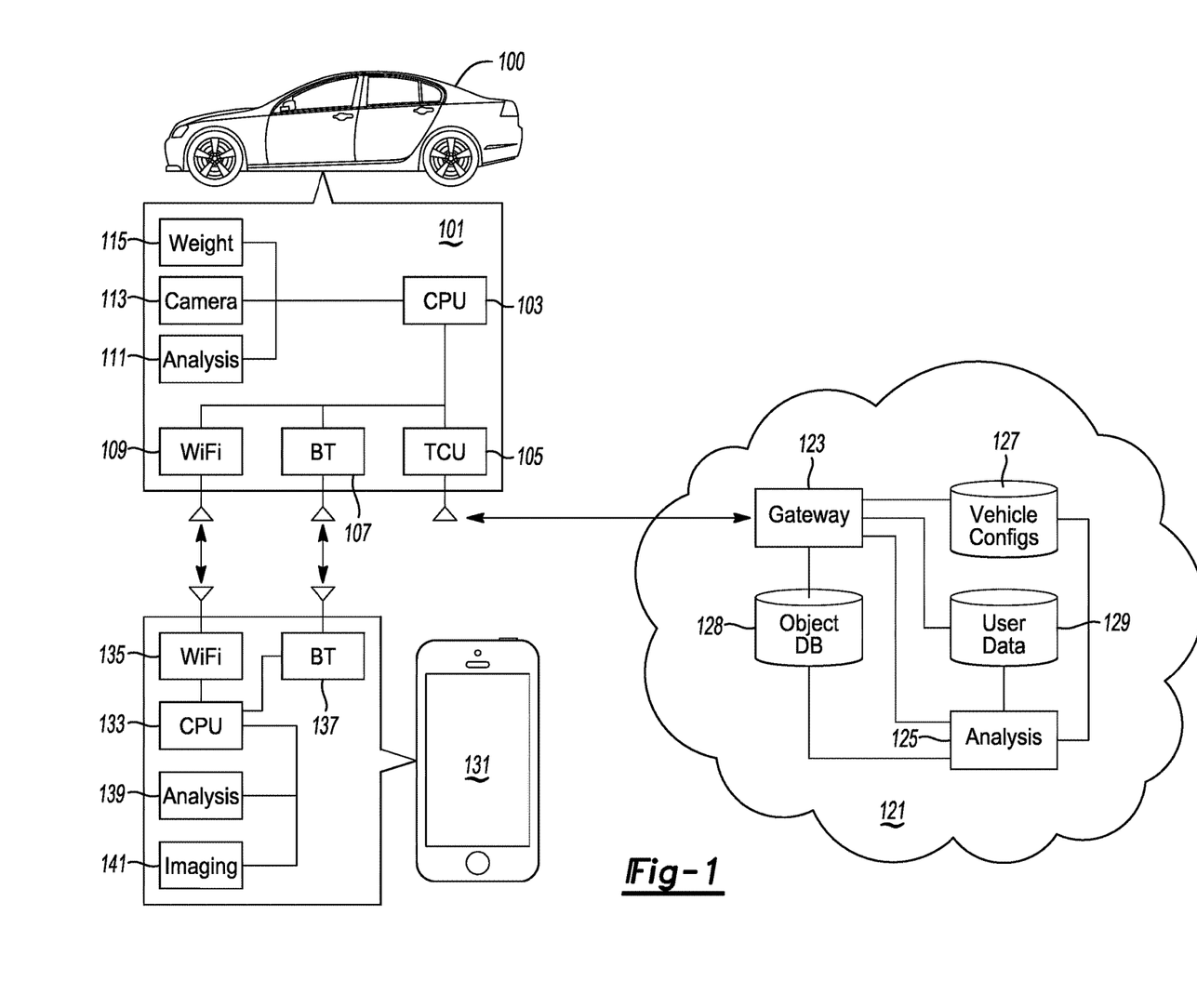
FIG. 1 shows and illustrative example of a load configuration system working between a vehicle, mobile device and cloud.

FIG. 1 shows and illustrative example of a load configuration system working between a vehicle, mobile device and cloud. In this example, a vehicle 100 includes an onboard computing system 101 capable of load analysis. Also, in this example, a mobile device 131 with an application 139 is used for load tracking and analysis, but it is appreciated that the vehicle itself can also perform such an analysis and provide the user with instructions (visual or verbal) as to how to load a load.

For example, in one instance, a user may use the mobile device 131 to scan packages when purchasing items and the dimensions of those packages may be available in the cloud 121 as part of an object database 128, which may also include weights, constraints, etc. The imaging application 141 on the phone 131 may be used to scan barcodes or QR codes associated with objects. In other instances, the imaging may be sophisticated enough to dimension an object based on images of the object, and/or images of the object placed near a reference object (e.g., such as the vehicle itself).

In an alternative example, a wireframe or other guide could be overlaid onto the imaging display, and the user could fit the object within the frame, with instructions to indicate certain dimensions (height, length, width) corresponding to elements of the wireframe, so the analysis process 139 can dimension the object and determine placement and capability of the vehicle 100 to handle the object. The vehicle computing system 101 may include one or more onboard processors 103, cellular communication through a telematics control unit (TCU) 105, and local communication through BLUETOOTH 107 and Wi-FI 109 transceivers.

Weight sensors 115 in the vehicle can be used to assess package loads and determine occupancy or object placement (e.g., whether an object is already in a seat). Interior and exterior cameras 113 can also provide object analysis and interior availability analysis. Since the interior of the vehicle 100 is relatively fixed, a partial load can be observed and clearances remaining can be determined and compared against objects for new placement. Even if the vehicle 100 does not have cameras covering every angle, certain clearances may be assessable based on a partial load.

The analysis process on the vehicle could receive data in the same way as the phone 131, i.e., through scanning objects with the phone itself (and transmitting the data) or through using a vehicle sensor to scan objects. The phone 131 can convey data through Wi-Fi 135 or BLUETOOTH transceivers, and may also include a cellular connection to the cloud 121.

The cloud 121 may include a gateway process 123 for request handling, as well as a cloud analysis process 125 that can leverage faster computing as well as assist users who may lack capability to perform on-site analysis. For example, a user with an irregular load may only have a computer and no imaging capability, and so must input the dimensions of the pieces of the load. This can be sent to the cloud, wherein a detailed analysis can be performed relative to the user's vehicle 100.

The cloud may also store vehicle configurations 127, accessible by any of the analysis processes as necessary, and which may include general (model) capabilities and constraints as well as specific (a VIN or ESN specific) configurations for a specific vehicle (e.g., reinforced supports, roof rack, optional stowages, etc.).

The cloud may also store user data 129, which can include user preferences, user physical dimensions (e.g., height), family dimensions (e.g., height, car seats, etc.), which may serve as constraints when configuring a load (e.g., preventing a seat from being moved too far forward to accommodate a six foot ten inch tall driver).

Additionally, the cloud 121 may store records of object dimensions, weights and constraints 128, which can include both specific objects (brand and model number) as well as general objects and general constraints. So, for example, if the user is purchasing a new microwave from a store, the specific dimensions of the box, as well as weights of the box, orientations and load-bearing constraints may be known. On the other hand, if the user is purchasing a used microwave, there may be some general information about loading and load-bearing, such as planning orientation and warning the user not to turn the microwave on its side to avoid damaging a glass rotating insert, as well as avoiding placing heavy loads atop the microwave frame. Disclaimers may be included with the loading, to avoid responsibility for unknown circumstances or unknown already-existing damage, for example, but the user may still generally appreciate the loading tips associated with many object (e.g., without limitation, removing feet from a couch, avoiding stressing wooden frames of furniture, loading long glass sideways to avoid it snapping under its own weight, etc.).

Even when an object is unknown, it may be possible to reach out to a manufacturer or obtain general dimensions and warnings online from other sources, and so the load configurator and analysis process can potentially access a large data set of information relating to a myriad of objects. Even things like general object density may be known—e.g., loading a four foot log of pine with an 8 inch diameter or an ~1×1 foot blue quartz boulder—and it may be possible to generally advise someone with regards to the likely characteristics of the object without knowing exact specifics.

The analysis process 139 on the phone, for example, may track load accommodation while a user shops, and accumulate load totals and plan configurations as purchases are made (this can also be done in conjunction with the vehicle 100 or the cloud 121). As each item is added to a load, assuming the dimensions are known, the available load space decreases and the number of possible configurations decreases. At some point, a user may be instructed that only objects of less than certain dimensions or weights should be purchased in order to still be able to load a vehicle.

Figure 2:
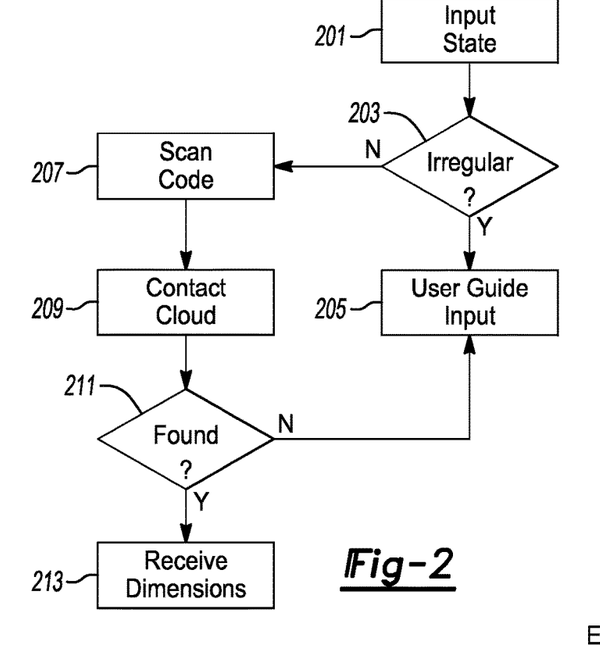
FIG. 2 shows an illustrative example of an object dimensioning process.

FIG. 2 shows an illustrative example of an object dimensioning process. In this example, the user uses the phone 131 to input an object for loading into a vehicle 100. The user can specify at 201 scanning (for regular, store-bought objects) and/or irregular for natural objects or objects lacking an associated code.

If the object is irregular at 203, the mobile device 131 may guide the user through dimensioning at 205, which can include, for example, instructing measurement along 3 axes, if possible, as well as locking the object to a wireframe, weighing an object, identifying stress points (e.g., user identification if not discernable). The user can image the object, under instruction, from a variety of poses and indicate on the images points of stress or caution that the configurator can avoid having a load placed thereon. For example, an antique chair may only be loaded back-down, and the user may not want stress on arms or other surfaces, and so the configurator could accommodate this if the user indicates areas where stress is to be avoided. The user could indicate the dimensions of the chair, and/or the configurator could indicate general clearances and capacities for most chairs, and the user can decide if any are suitable, when the dimensions are not exactly or generally known.

In an instance where there is a bar code, QR code or other machine readable code, or express dimensions on packaging, at least, a user can scan the code at 207, using a camera of the mobile device 131. In other instances, scanning a brand name and model name (e.g., Brand—SleepyGuy Chairs, Model—Snoozer 200) may be sufficient for the analysis process to look up dimensions from another source, such as the object repository 128 or other online sources.

Whether a code or brand name or other machine-discernable input is used, the process can contact the cloud 121 at 209 and determine if specifications for the object can be found at 211. If not, the process may revert to the irregular object guide at 205. In some instances, the process may return a list of choices— (e.g., "please select Snoozer 200-X, 200-Y or 200-Z") and the user can complete the identification where multiple configurations of a model may exist. This identification can include characteristics the user may be able to use to complete the analysis—e.g., 200-X includes a metal handle, 200-Y includes a massage function, etc. Once identification of the object is complete, the process may receive the dimensions at 213, either relatively precise for known objects or user-input and assisted for irregular objects.

If there is only one object in a load, the analysis process can use the dimensional information to attempt to determine a usable passageway into the vehicle 100 and an object orientation for loading and stowage. If multiple objects are in a load, the process may add the load to a virtual "cart" as discussed in example in regards to FIG. 3 below.

Figure 3:
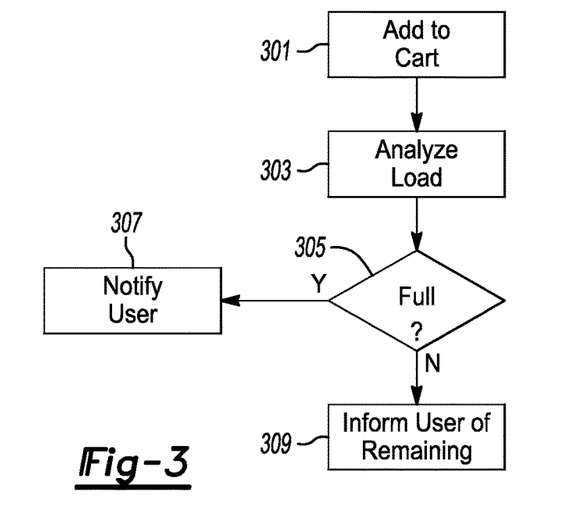
FIG. 3 shows an illustrative example of a total load tracking process.

FIG. 3 shows an illustrative example of a total load tracking process. In this example, the user is purchasing multiple items or selecting multiple items to load. As each items is added to the "cart" at the end of an analysis process at 301, the process may re-evaluate the load at 303, accommodating the newly added item. Users may also be able to see active loads, including item lists, and may be able to remove items or indicate alternative transportation for certain items if a load is over the limit.

While not discussed in great detail herein, it is also possible to accommodate multiple vehicles in a load configurator, such as a fleet or two family vehicles both being driven to a site for loading. In this way, the configurator can divide the load (and possibly passengers) into optimal configurations to use available space of both vehicles in a combined manner, which would be a very difficult task for a human to visualize. The configurator can continually move items between loads to weight and space balance loads, and this may allow a family of two vehicles to successfully load a large load between the vehicles without having to leave anything out.

If the load analysis results in a "full" or nearly full load at 305, the process may inform the user at 307. This can also include identification of the largest or most complicated objects in a load, and how much space would be recovered if such an object were removed. In another example, the user may be allowed to "overfill" the load and then can be presented with selectable lists of groups of objects that should be removed or alternatively transported. That can allow a user to add all desired items to the virtual cart, and then decide, before purchase, which items should be returned to shelves, or shipped, or alternatively transported. For example, the user could buy 10 items and be told that either 1 large TV had to be removed, or 2 blenders and a toy set, or a drill kit. The user could then deicide if they wanted to remove these items, or maybe have a passenger carry certain of these items in a lap.

The load configurator may also accommodate human presence, either based on indicated intended seating positions or previously detected utilized seating positions. For example, a car seat may be considered fixed occupancy of a space, but may also be used for loading space for light objects when an occupant is not present. A front seat passenger may be (dynamically or based on user preferences) moved around to other seating locations—e.g., if sliding the front seat all the way forward creates the necessary space configurations, the passenger may be moved to a location-fixed back seat. User dimensions (e.g., height constraints) from user repository 129 may be used in this analysis, if known and if it is know which users will be located in the vehicle. The configurator may also accommodate placement to maintain recommended clearances around occupied seating areas.

Also, the configurator may provide a visual indicator (e.g., a mock up of a vehicle interior) that shows virtual placement so that an owner can appreciate how the space is being used. That is, while a configurator may not recommend utilizing certain space, that space may still exist and the owner can decide the reasonableness of using the space that the configurator doesn't utilize.

Figure 4:
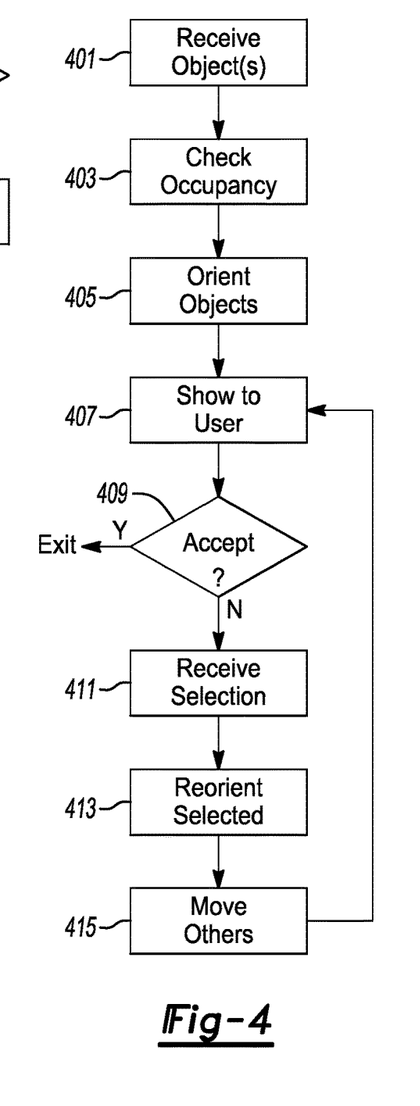
FIG. 4 shows an illustrative example of a load reconfiguration process.

FIG. 4 shows an illustrative example of a load reconfiguration process. In this example, the process receives the object identifications at 401 (e.g., as in FIG. 2, and determines vehicle occupancy at 403. Occupancy determinations can include, but are not limited to, a user indicating intended occupancy of seating and/or a total number of passengers and/or specifically identifying passengers and/or any necessary seating positions.

Based on seat utilization and the object load, the process can orient the objects in a recommended configuration, which may not be the only configuration, at 405. The process then can display the load to a user, as a list of placements, or a visual guide showing space utilization, which can include detailed renderings or wireframe placement of objects, for example. Block dimensioning (treating an object as a polygon with maximal object dimensions) may also be used, so that something like a chair is treated as a large 3D rectangle or a combination of 3D rectangles without actually rendering a chair. Since every available inch of space is unlikely to be used in most instances, loose approximation will often suffice, especially for such rendering.

If the user accepts the configuration at 409, this configuration will be eventually used to present loading instructions, if desired. If the user does not like the selection, the user can choose an object (which may include, but is not limited to, reorienting a displayed space to choose an object, or stripping away layers, or simply choosing an object from a list). The user can specifically reorient an object at 413, or the configurator can show various possible placements for the object as a series of choices, and the user can select a preference. The configurator can then rebalance the load at 415 around the desired placement and show the user the object load again at 407.

The user may be able to selectively lock objects in desired locations and continually select, reorient and lock additional objects until a preferred load orientation is obtained. This could be useful, for example, if multiple stops were being made to deliver a load, wherein certain objects needed to be in exterior accessible positions based on a planned route. Again, while not discussed in great detail, the user could actually specify this in advance (while building a cart) and the configurator could generally attempt to accommodate this placement in advance, including providing unloading instructions for each stop and effectively delivering a route-travel plan along with unloading instructions for a load that was assembled with the specific route and unloading in mind.

Similarly, the user may be able to lock out certain areas, which may be useful if those areas are intended for stowage of other objects. For example, a user may want foot wells clear for food stowage if bringing presents and food to a relative's house, and the configurator may not appreciate that it is inappropriate to place a large pot full of stew amidst a bunch of packages, even if the pot fits. According, the user could lock out a space on the floor for the pot and the configurator would use other space for the packages.

Figure 5:
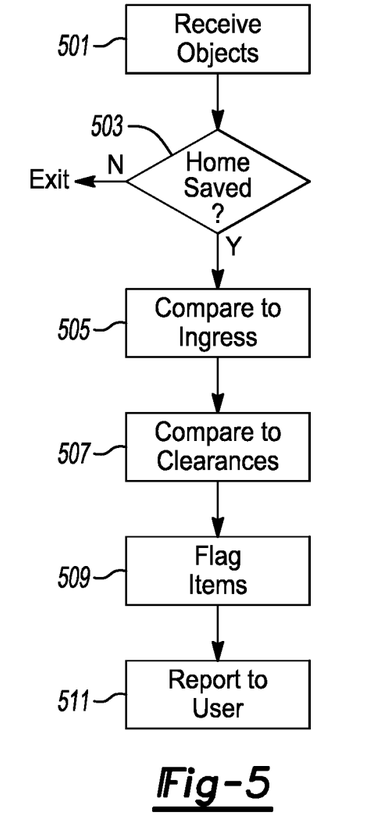
FIG. 5 shows an illustrative example of a home-ingress analysis process.

FIG. 5 shows an illustrative example of a home-ingress analysis process. In some example, the user may have personal dwelling or storage or office space (for example) dimensions saved in the user repository 129 or in another location. This may not include all dimensions, but may include main doorways and choke points (e.g., stairway or hallway turns). Such information, once known, may allow the configurator to give the user at least general advice about whether something will fit through a given point, as well as provide at least general orientation instructions about how to manuver the object to clear the point.

While not necessary, instructions for both loading and maneuvering can include, for example, a video showing object renderings and/or block dimensioning moving through space. Since the analysis process may leverage spatial analysis tools, and may be able to determine a motion-orientation analysis of how an object can clear a space, it may be useful to provide at least a loose rendering of this strategy to the user (e.g., a short video or series of pictures).

The user with such home-based information loaded can use the process to input a load at 501, and if the home (or other space) is saved at 503, the process can compare each element of the load to the known ingresses at 505 and clearances at 507. This can include, but is not limited, to, doorways, turn points, hallways, hanging fixtures, etc. The process may flag any items of concern at 509 and issue a report to the user at 511, which can indicate items that should fit, items of concern, items that may not fit, and any accompanying links, videos, descriptions, pictures or strategies for item movement.

Figure 6:
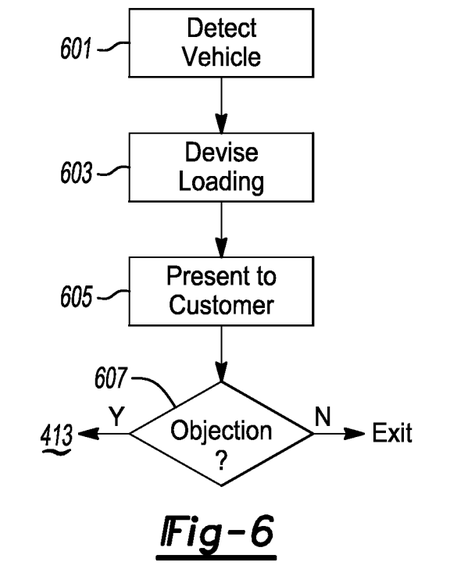
FIG. 6 shows an illustrative example of an automatic load configurator.

FIG. 6 shows an illustrative example of an automatic load configurator. In this example, the process may have been gathering a load as a user shops, but may not have a specific known vehicle in mind. Or, for example, the configurator can be provided as a plug-in to a shopping application, wherein the user can use the shopping application as they shop to acquire a cart full of items (in real life) and then as the user approaches a vehicle the configurator takes over and recommends load placement.

In this example, the process may be less concerned with filling a vehicle completely and more directed towards efficient loading and space utilization. For example, a user shopping at a wholesale goods store may buy far fewer objects than will actually fill the vehicle, and yet still may be confounded as to how to appropriately occupy a rear space footprint to stow the objects. As the configurator detects the vehicle at 601, it can devise a loading and stowage strategy at 603.

This strategy may be presented to the customer at 605. If the user accepts the strategy and/or placement (either or both may be presented) at 607 the process exits. Otherwise, the process may branch to a process such as that beginning at 413, where the user can selectively alter load placement or simply ask for a new configuration, which could include indicating one or more areas where there should not be any load.

Selection of items for load movement and/or areas where there should not be load can be done graphically (selecting on a 2D or 3D image, which may be rotateable and/or changeable to show various aspects) or via selection from a list of items. For example, a user can touch an element to be changed in an image, touch an area to be avoided, select from a list and see the element or area highlighted in the image, etc.

Figure 7:
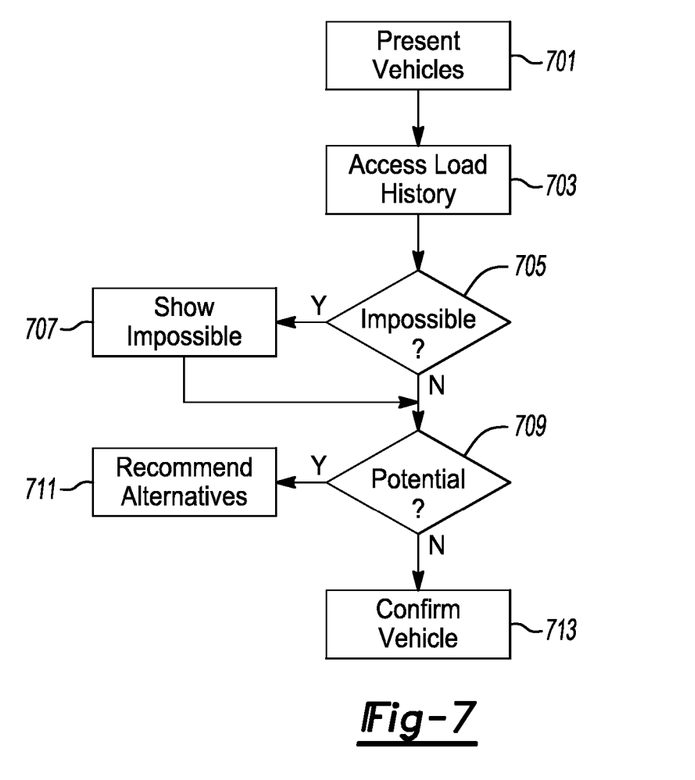
FIG. 7 shows an illustrative example of a load-capability analysis process.

FIG. 7 shows an illustrative example of a load-capability analysis process. In this example, the user may be purchasing a new vehicle, or shopping for a new vehicle. The user may be presented with a list of chosen or preferred vehicles at 701, which can include vehicles specified by the user and/or recommended by the dealer.

The process can access a customer load history at 703, which may be stored in a personal information repository 129, for example. This can show historic loads, common loads, etc. The analysis may be statistical as well—e.g., "95% of loads require less than 12 cubic feet of cargo and weigh less than 300 lbs."

The past loads can then be compared to one or more proposed vehicles to determine which loads, if any, would have been impossible using the new vehicle at 705. That is, if there are one or more loads that simply could not have been placed within the new vehicle at 705, the process can display those loads at 707 so the customer can appreciate what could not have been transported using the new vehicle. This may not present a problem, especially if a large load was a one-time occurrence. This part of the process can also identify loads that, for example, come within a threshold of a preferred loading point (e.g., 90% full or 90% of weight capacity for load-bearing member).

The process may also determine if there are one or more alternative versions of either the same vehicle or a different vehicle that could possibly handle the impossible or threshold (or any other parameter) loads at 709. This provides an opportunity to present the customer with alternative vehicle options, and the process can recommend any alternatives at 711, along with identifying which impossible or threshold loads could be more easily handled by the alternative. This could be useful if, for example, 50% of prior loads would not fit in a preferred new vehicle, but a different version of the vehicle (e.g., different seating configurations) could handle 90% of the loads.

If there are no potential alternative, the customer can confirm selection of the vehicle for a final list of consideration at 713 and continue to purchase and/or analyzing a different possible vehicle.

Through the use of the illustrative embodiments and the like, the difficult, sometimes impossible, task of loading complex loads into complex spaces can be more easily achieved. Customers can avoid vehicle damage, understand loading strategies (what goes in first) and understand seat movements. If the vehicle has powered adjustable seating, the mobile device can even send a command to the seating to move the seating into the correct position for the load, prior to the customer even loading a package. In other examples, the movement may be iterative—e.g., load box A then slide seat forward 6" and lay flat, and the customer can indicate when the first step is done so the second can occur, which may allow for use of spaces that will be partially blocked (for example, by a headrest) and which can only be accessed when a seat is in a prior configuration.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A system comprising:
one or more processors configured to:
receive identification of an item to be loaded into a vehicle;
determine dimensions of the item;
add the item to a total load for an identified vehicle;
based on known dimensions of available space in the identified vehicle, determine one or more candidate placement options for each of one or more items comprising the total load, within available space within the vehicle, wherein candidate placement options for each item are determined so as not to overlap with placement options for another of the one or more items within a given configuration representing placement options for all of the one or more items comprising the total load;
present a visual rendering of at least one given configuration that successfully allows the total load to fit within the available space;
receive user selection of at least one of the one or more items in the at least one given configuration;
receive instruction as to an action to be taken with regards to the selected at least one of the one more given items; and
adjust the at least one given configuration to reflect the action, wherein the action includes locking the at least one item in a placement indicated by the at least one given configuration, so that future modification of the at least one given configuration will leave the at least one item in a position and orientation as indicated prior to selection of the at least one item.

2. The system of claim 1, wherein at least one of the one or more processors is further configured to:
receive an image associated with the item and determine the dimensions based at least partially on the image.

3. The system of claim 2, wherein the image includes a digitally readable code usable to identify the item and wherein the dimensions are determined based on known packaging or sizing associated with the item indicated by the digitally readable code.

4. The system of claim 2, wherein the image includes an image of the item and wherein the dimensions are determined based on sizing of the item determinable from the image.

5. The system of claim 1, wherein the dimensions are determined based on input from a user.

6. The system of claim 1, wherein the candidate placement options include recommended orientation of at least one of the one or more items.

7. The system of claim 6, wherein the orientation is based on recommended restrictions associated with the at least one of the one or more items.

8. The system of claim 7, wherein the recommended restrictions are determined based on item manufacturer recommendations identified when the at least one of the one or more items is identified.

9. The system of claim 7, wherein the recommended restrictions are determined based on a type of the at least one of the one or more items identified when the item is identified.

10. The system of claim 1, wherein the visual rendering includes a plurality of two dimensional renderings representing different viewpoints of a vehicle interior including the total load placed based on the at least one given configuration.

11. The system of claim 1, wherein the visual rendering includes at least one three dimensional rendering representing a vehicle interior including the total load placed based on the at least one given configuration.

12. The system of claim 1, wherein the action includes changing at least one of position or orientation of the at least one item, and wherein the adjustment further includes determining and presenting at least one new given configuration wherein the at least one item is in a respective new position or orientation.

13. The system of claim 1, wherein the selection includes touching the item as displayed in the visual rendering.

14. The system of claim 1, wherein the selection includes selecting the item from a list of items displayed in addition to the visual rendering.

15. The system of claim 1, wherein the one or more candidate placement options are further determined based on known load-bearing recommendations of one or more vehicle elements compared to a load created on the one or more elements based on placement of at least one of the one or more items in contact with the one or more elements.

16. The system of claim 1, wherein the one or more candidate placement options are further determined based on known load-bearing recommendations of at least one first of the one or more items compared to a load created on the at least one first item based on placement of at least one second of the one or more items in contact with the at least one first item.

17. A method comprising:
receiving identification of an item to be loaded into a vehicle;
determining dimensions of the item;
adding the item to a total load for an identified vehicle;
based on known dimensions of available space in the identified vehicle, determining one or more candidate placement options for each of one or more items comprising the total load, within available space within the vehicle, wherein candidate placement options for each item are determined so as not to overlap with placement options for another of the one or more items within a given configuration representing placement options for all of the one or more items comprising the total load;
presenting a visual rendering of at least one given configuration that successfully allows the total load to fit within the available space;
receiving user selection of at least one of the one or more items in the at least one given configuration;
receiving instruction as to an action to be taken with regards to the selected at least one of the one more given items; and
adjusting the at least one given configuration to reflect the action, wherein the action includes locking the at least one item in a placement indicated by the at least one given configuration, so that future modification of the at least one given configuration will leave the at least one item in a position and orientation as indicated prior to selection of the at least one item.

18. A non-transitory computer-readable storage medium storing instructions that, when executed, cause at least one executing processor to perform a method comprising:

receiving identification of an item to be loaded into a vehicle;

determining dimensions of the item;

adding the item to a total load for an identified vehicle;

based on known dimensions of available space in the identified vehicle, determining one or more candidate placement options for each of one or more items comprising the total load, within available space within the vehicle, wherein candidate placement options for each item are determined so as not to overlap with placement options for another of the one or more items within a given configuration representing placement options for all of the one or more items comprising the total load;

presenting a visual rendering of at least one given configuration that successfully allows the total load to fit within the available space;

receiving user selection of at least one of the one or more items in the at least one given configuration;

receiving instruction as to an action to be taken with regards to the selected at least one of the one more given items; and adjusting the at least one given configuration to reflect the action, wherein the action includes locking the at least one item in a placement indicated by the at least one given configuration, so that future modification of the at least one given configuration will leave the at least one item in a position and orientation as indicated prior to selection of the at least one item.

* * * * *